(12) United States Patent
Sun

(10) Patent No.: US 8,171,401 B2
(45) Date of Patent: May 1, 2012

(54) RESIZING AN EDITABLE AREA IN A WEB PAGE

(75) Inventor: Jimmy Y. Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 12/487,859

(22) Filed: Jun. 19, 2009

(65) Prior Publication Data

US 2010/0325529 A1 Dec. 23, 2010

(51) Int. Cl.
*G06F 17/00* (2006.01)
(52) U.S. Cl. ........................ 715/252; 715/251
(58) Field of Classification Search .................. 715/205, 715/251, 252, 200
See application file for complete search history.

(56) References Cited

U.S. PATENT DOCUMENTS

| 5,227,771 | A | 7/1993 | Kerr | 340/731 |
|---|---|---|---|---|
| 5,583,981 | A | 12/1996 | Pleyer | 395/326 |
| 6,392,673 | B1 | 5/2002 | Andrew | 345/800 |
| 6,948,119 | B1 * | 9/2005 | Farmer et al. | 715/206 |
| 6,973,627 | B1 * | 12/2005 | Appling | 715/781 |
| 7,028,255 | B1 * | 4/2006 | Ayers | 715/202 |
| 7,206,999 | B2 * | 4/2007 | Kato | 715/225 |
| 7,216,293 | B2 * | 5/2007 | Kataoka et al. | 715/246 |
| 7,430,712 | B2 | 9/2008 | Arokiaswamy | 715/234 |
| 7,685,514 | B1 * | 3/2010 | Khatwani et al. | 715/251 |
| 2001/0011364 | A1 * | 8/2001 | Stoub | 717/1 |
| 2002/0091755 | A1 * | 7/2002 | Narin | 709/203 |
| 2003/0034991 | A1 * | 2/2003 | Fitzsimons et al. | 345/660 |
| 2003/0226113 | A1 * | 12/2003 | Altman et al. | 715/520 |
| 2004/0268248 | A1 * | 12/2004 | Makela | 715/523 |
| 2006/0031417 | A1 * | 2/2006 | Narin | 709/219 |
| 2006/0117255 | A1 * | 6/2006 | Seeler | 715/520 |
| 2006/0195784 | A1 * | 8/2006 | Koivisto et al. | 715/523 |
| 2006/0218490 | A1 * | 9/2006 | Fink | 715/517 |
| 2007/0220480 | A1 | 9/2007 | Waldman | 717/106 |
| 2007/0234195 | A1 * | 10/2007 | Wells | 715/501.1 |
| 2008/0270909 | A1 * | 10/2008 | Kaufman et al. | 715/738 |
| 2008/0282149 | A1 * | 11/2008 | Williamson et al. | 715/251 |
| 2009/0015717 | A1 | 1/2009 | Arnao | 348/581 |
| 2009/0193032 | A1 * | 7/2009 | Pyper | 707/10 |
| 2009/0276697 | A1 * | 11/2009 | Mielke et al. | 715/252 |
| 2009/0300506 | A1 * | 12/2009 | Drucker et al. | 715/738 |
| 2011/0264996 | A1 * | 10/2011 | Norris, III | 715/236 |

OTHER PUBLICATIONS

Greenberg et al., Generating Custom Notification Histories by Tracking Visual Differences between Web Page Visits, Google 2006, pp. 227-234.*

(Continued)

*Primary Examiner* — Cong-Lac Huynh
(74) *Attorney, Agent, or Firm* — Merchant & Gould

(57) ABSTRACT

Embodiments of the present invention provide for vertically and/or horizontally resizing a zone or DIV element of a Web page via a browser-based Web authoring tool, while preserving a DIV element's ability to dynamically size to its Web content. Drag and drop vertical resizing of a DIV element is accomplished by creating two hidden DIV elements that are set to the specific left/top anchor, width, and altered HTML content of the DIV element to be resized. The two hidden DIV elements provide specific top and bottom pixel height limits to determine when a line break should be appended or decremented to the original DIV element's HTML content. By utilizing line breaks to vertically resize, a DIV element maintains its capability of sizing to dynamic Web content.

20 Claims, 8 Drawing Sheets

OTHER PUBLICATIONS

Robertson et al., Scalable Fabric: Flexible Task Management, ACM 2004, pp. 85-89.*

Collura, Macromedia Dreamweaver MX 2004, Google 2004, pp. 1-34.*

"Creating and Modifying a CSS File." *Microsoft Developer Network.* Jun. 18, 2009 <http://msdn.microsoft.com/en-us/library/bb398932.aspx>.

Burgess, Brice. "Minimalistic Drag'n'Resize for jQuery." *iCEBURG; Smart Computer Solutions.* Aug. 19, 2007. Jun. 18, 2009 <http://dev.iceburg.net/jquery/jqDnR/>.

"Horizontal and Vertical CSS Menu Tutorial" *SEO Consultants*.com. Feb. 1, 2009. Jun. 18, 2009 <http://www.seoconsultants.com/css/menus/tutorial/>.

"Moving and Resizing Objects." *EDD/DM User's Manual, 2.4.* Mar. 27, 1997. The University of California, The University of Chicago. Jun. 18, 2009 <http://www.aps.anl.gov/epics/extensions/OPI/opintro-30.html>.

Kandogan, Eser. "Resize." *Human-Computer Interaction Lab; University of Maryland.* Sep. 13, 1998. Jun. 18, 2009 <http://hcil.cs.umd.edu/trs/98-13/node34.html>.

* cited by examiner

RESIZING AN EDITABLE AREA IN A WEB PAGE

BACKGROUND

As the Web has progressed since its creation, the markup languages used to format a Web page have also progressed. Hypertext Markup Language (HTML), the predominant markup language for Web pages, has progressed from only giving Websites basic structure of headings and paragraphs to become more complex and flexible, allowing users to add objects, such as images and tables, to a page.

Various Web site authoring tools or applications exist, which aid in Web page creation and design. Some Web site authoring tools may be implemented via a Web browser. These tools are typically more limited in functionality as compared to client-based tools. Many browser-based Web authoring tools either rely on a user to understand how to write code to create a Web site, or on the other hand, allow a user to enter data and drag-and-drop objects into a pre-designed Website template, requiring no HTML knowledge.

If a user understands how to write code to create a Web site, he/she can start with a blank page and create a completely customized Web page. With a pre-designed Web site, the design is typically set, and a user simply inserts the data he/she wants into text frames included in the template. A need exists for a negotiation between these two design extremes, giving a user more capability to design a Web site and to affect the layout without requiring him/her to understand the underlying code beneath the surface.

Most modern Web pages are constructed with multiple zones. A zone may be an HTML DIV element that is enclosed by a table cell. DIV elements are containers in which a user may place Web content. Collectively, zones may form an entire Web site. The terms "zone" and "DIV element" may be used interchangeably herein. When designing a Web site, a user must account for several factors that he/she has no control of when his/her Web site is viewed on the Web, for example, the size of the browser window, the Web browser used, the input devices used, and the size, design, and other characteristics of the fonts users have available on their own computers. This means that the content is dynamic; it may change in size and hence, underlying DIV elements must also change in size in order to contain all of the data and preserve the design of a Web site. A user may choose to control the appearance of the elements on a screen by specifying the width of DIV elements. If the width of a DIV element is specified, the height remains variable, and the contents may wrap at the specified width. Thus, regardless of which browser or screen resolution is used, the contents within the DIV element will wrap at the specified width, and the integrity of the Web page design is preserved.

A user may choose to specify a height of a DIV element in addition to a width. Web site editing tools exist for allowing for the vertical resizing of DIV elements; however, such tools accomplish vertical resizing by setting a cascading style sheet (CSS) height attribute of the DIV element. By setting the CSS height attribute of a DIV element, the DIV element becomes fixed, and is unable to size to dynamic Web content. For example, if an individual is viewing a Web page with a DIV element containing a specified width and height, and if the individual has his text display size set at a large size, the content contained within the DIV element may either be cut off by the dimensions of the DIV element, or may flow out of the DIV element and into other content. In either case, the intent of the Web design may be destroyed.

It is with respect to these and other considerations that the present invention has been made.

SUMMARY

Embodiments of the present invention are directed to resizing a height and/or a width of a DIV element, while preserving its ability to dynamically size to Web content utilizing a browser-based Web authoring tool. A user may select and drag a drag-and-drop mechanism to resize a DIV element. To achieve vertical resizing, a drag-and-drop mechanism may be moved either up or down, which may either increment or decrement line breaks in the DIV element's content. The process of incrementing or decrementing line breaks may increase or decrease the vertical height of a DIV element.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
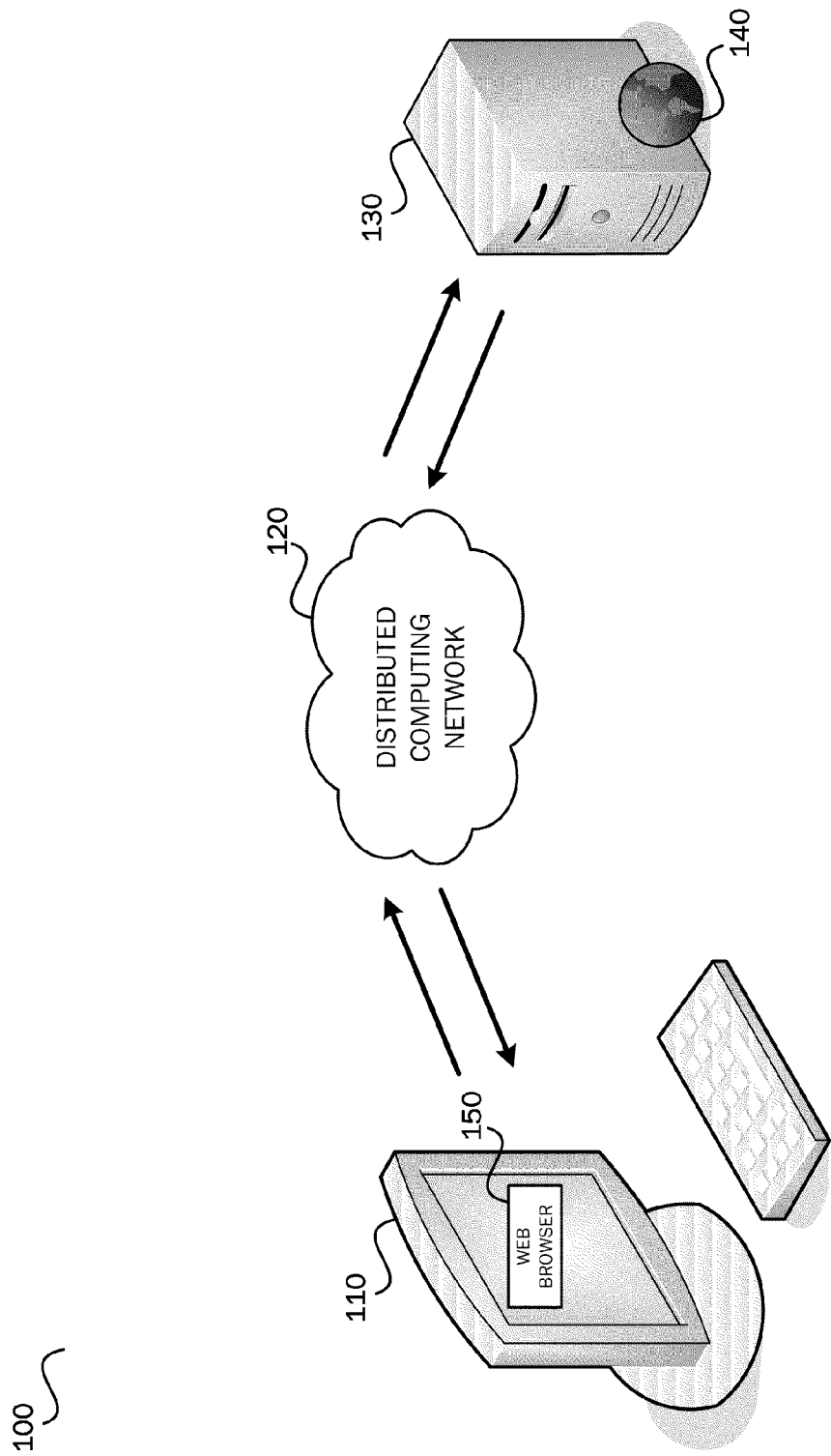
FIG. 1 is a simplified block diagram of a computing architecture in which embodiments of the present invention may be implemented.

As briefly described above, embodiments of the present invention are directed to resizing a width and/or height of a DIV element via a browser using a Web-based authoring tool, while preserving the DIV element's ability to dynamically size to Web content. To achieve the resizing of a DIV element's height while preserving its ability to dynamically size to its content, line breaks may be utilized. According to an embodiment, when a user selects and drags a drag-and-drop mechanism to resize a DIV element in the vertical direction, an HTML tag for inserting a line break (i.e., <br>) is inserted or removed from the underlying HTML document, which a Web browser reads, interprets, and accordingly displays as a Web page. By incrementing and/or decrementing line breaks (<br>) within a DIV element, the DIV element's ability to dynamically resize to its content is preserved.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram of one embodiment of a computing architecture for creating, distributing, requesting, pulling, and displaying a Web page. The example system 100 may include a client computing device 110, a distributed computing network 120, and a remote server 130. Greater or fewer clients, networks, and servers may be used.

In example embodiments, client computing device 110 may be a desktop computer, laptop computer, terminal computer, personal data assistant, cellular telephone device, or any other computing device known in the art. Computing device 110 may include input/output devices, a central processing unit ("CPU"), a data storage device, and a network device. According to an embodiment, computing device 110 may include a Web browser 150. In the present disclosure, the terms client and client computing device are used interchangeably.

Remote server 130 is a computing device that may include a database server and a front-end server that is accessible to client 110 through distributed computing network 120. Remote server 130 may include input/output devices, a central processing unit ("CPU"), a data storage device, and a network device. In example embodiments, distributed computing network 120 is the Internet and client 110 may remotely access remote server machine 130, which may be operable to run a Web server 140.

According to an embodiment, client 110 may include a Web browser application 150, for example INTERNET EXPLORER from MICROSOFT CORPORATION of Redmond, Wash. The Web browser application 150 may be utilized to request a Web page from a Web server 130, pull the page through a network 120, and onto the client computing device 110. The Web browser application 150 may be utilized to interpret the HTML tags within the Web page and accordingly display the page on a display of the client computing device 110. The Web browser application 150 may also be utilized to author and/or edit HTML content.

According to an embodiment, Web server 140 is a piece of computer software operable to respond to a Web browser's 150 request for a page, and then deliver the page to the Web browser through a distributed network 120.

Figure 2:
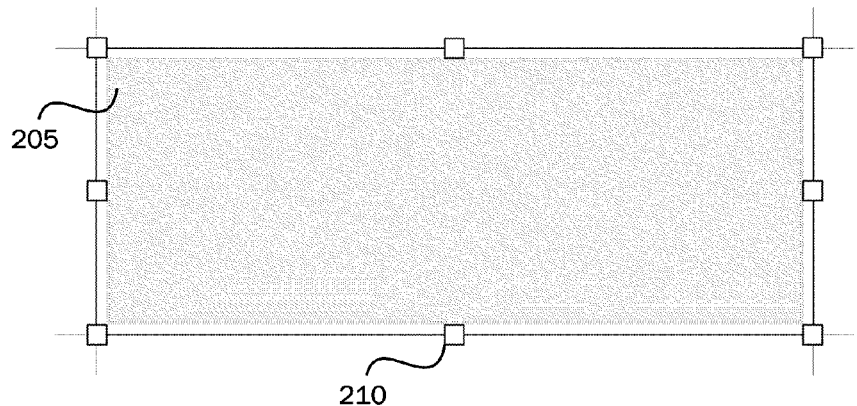
FIG. 2 is an illustration of an example DIV element containing drag-and-drop mechanisms (resize markers).
Figure 3:
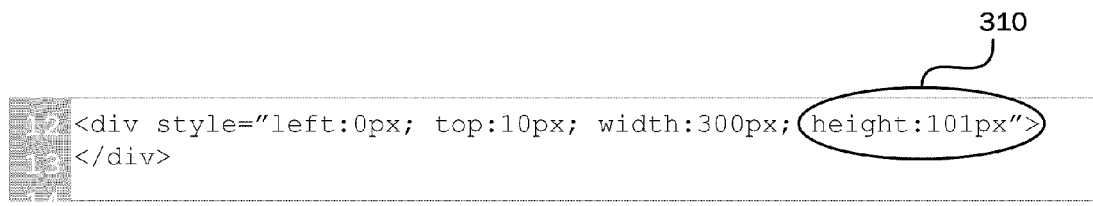
FIG. 3 is an illustration of an example HTML code for a DIV element which has been resized utilizing current methods.
Figure 4:
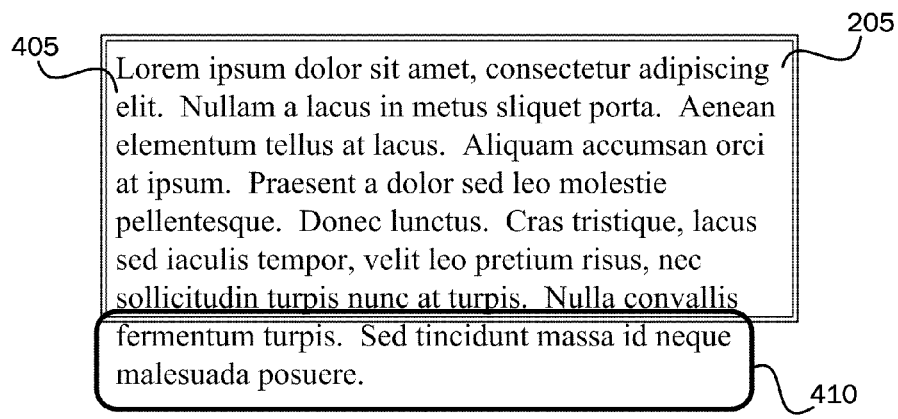
FIG. 4 is an illustration of the example DIV element of FIG. 2, which has been resized utilizing current methods, and contains text that has overflowed the DIV element.

Having described an example system 100 of an embodiment of a computing architecture in which embodiments of the present invention may be utilized, FIGS. 2-4 illustrate an example of a current method for resizing the height of a DIV element. As described previously, a DIV element defines logical divisions within a Web document, and may be utilized to achieve a desired structural and presentational effect by a user. When a DIV element is used, the enclosed content may be defined as a specific section of a Web page. Referring now to FIG. 2, a DIV element 205 is shown containing drag-and-drop mechanisms (resize markers) 210. Utilizing current methods, as a user selects and drags a resize marker 210, the pixel height of the DIV element is defined. When a DIV element's height is resized via a selection and dragging of a resize marker 210, the pixel height of the DIV element may be defined inside the code. For example, if a user selects and drags a resize marker 210 to manipulate the height of a DIV element 205, the resulting height of the DIV element may become part of the underlying HTML code that describes how the DIV element should be formatted.

FIG. 3 is an example of the underlying HTML code of a Web page. As shown in FIG. 3, the DIV element 205 of FIG. 2 is defined in the code by an HTML tag <div>. Within the brackets of the DIV element's HTML tag, the DIV element's 205 dimensions are defined. As shown on line 12 of the HTML code, the resulting height 310 of the DIV element 205 after resizing is defined as 101px. With the height 310 of the DIV element set inside the code, the height is no longer dynamic. If content inside the DIV element 310 does not fit within the set size of the DIV element, the content may either be cut off by the dimensions of the DIV element or flow out of the DIV element and into other content.

FIG. 4 is an illustration of the example DIV element 205 of FIG. 2 containing Web content 405. As shown in FIG. 4, the content 405 inside the DIV element 205 exceeds the set dimensions of the DIV element. Upon setting the height 310 of the DIV element 205, the DIV element loses the ability to adjust to any dynamic Web content 405. In this example, the text 405 has flowed out of the DIV element 205. The overflow of text 410 is shown in FIG. 4. When a DIV element's 205 height dimension 310 is set inside the code, and if the content 405 is any larger than the set dimensions, it may overlap another DIV element on the Web page, which may destroy the layout and design of a Web page.

Figure 5:
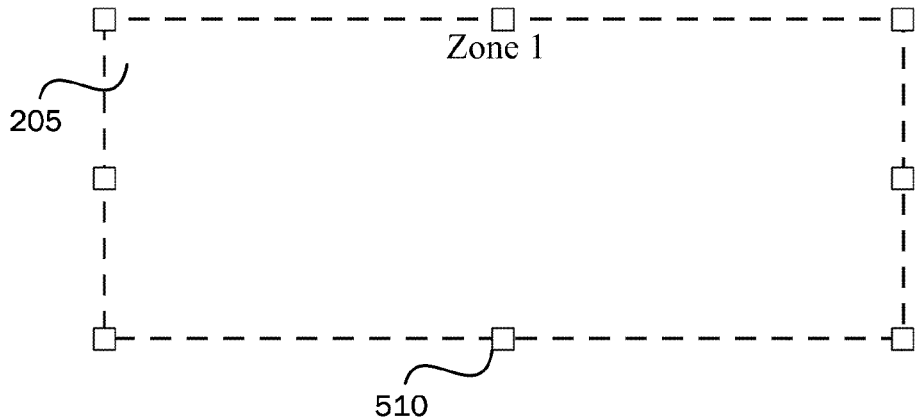
FIG. 5 is another illustration of an example DIV element containing drag-and-drop mechanisms (resize markers).
Figure 6:
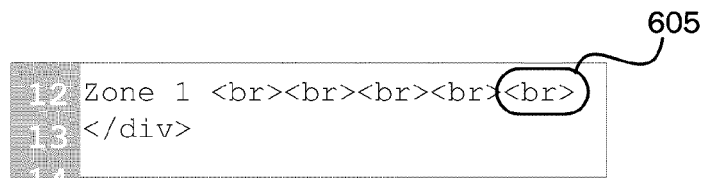
FIG. 6 is an illustration of an example HTML code for a DIV element which has been resized utilizing embodiment of the present invention.
Figure 7:
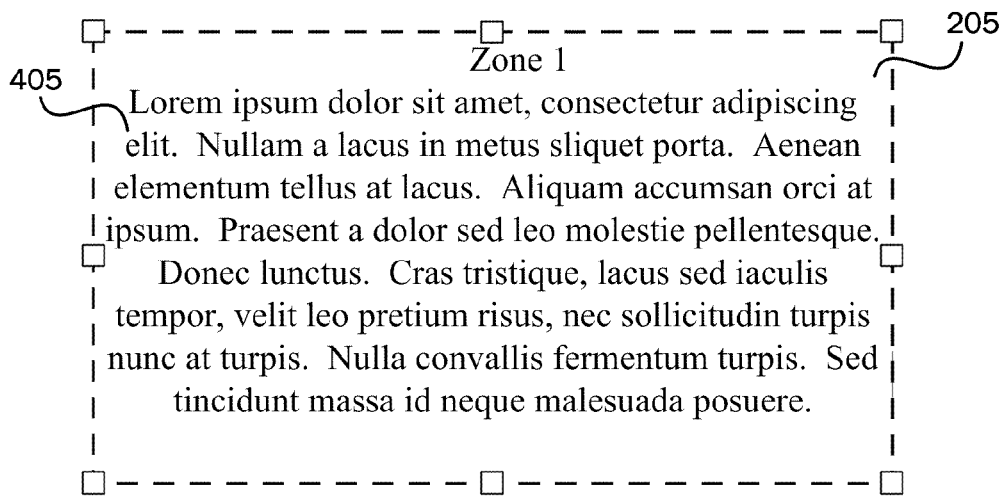
FIG. 7 is an illustration of the example DIV element of FIG. 5, which has been resized utilizing embodiments of the present invention.

FIGS. 5-7 illustrate an example of how embodiments of the present invention may be utilized for resizing the height of a DIV element while maintaining the integrity of a Web page's layout and design. As shown in FIG. 5, an intuitive user interface (UI) may be utilized to resize a DIV element 205. A user may select and drag a lower resize marker 510 up or down to increase or decrease the height of a DIV element 205. As should be appreciated, a user may select a lower resize marker 510 by various ways known in the art. According to an embodiment, a keyboard's UP and Down keys may be utilized to resize a DIV element 205 should a user tab to a DIV element's lower resize marker 510. Although various methods exist for selecting and dragging a lower resize marker 510, the terms "click-and-drag" and "select-and-drag" may be used interchangeably.

FIG. 6 is an illustration of an example HTML code for an example DIV element 205 whose height has been resized utilizing embodiments of the present invention. According to an embodiment, when the height of a DIV element 205 is increased, one or more line breaks (<br>) 605 may be appended to the end of the DIV element's Web content. As should be appreciated, various terms may be used to describe the HTML tag <br> 605, such as, line break, new line character, carriage return, new line, etc. The term "line break" will be used herein in reference to the HTML tag <br> 605, which may be utilized to specify a line break within Web content. According to an embodiment, as a DIV element's 205 height is increased, more line breaks 605 may be appended to the end of the DIV element's Web content.

According to another embodiment, when the height of a DIV element 205 is decreased, one or more line breaks (<br>) 605 may be removed from the end of the DIV element's Web content.

FIG. 7 is an illustration of the example DIV element 205 of FIG. 5 that has been resized utilizing embodiments of the present invention. Content 405 has been added to the DIV element 205, and as can be seen in FIG. 7, the content does not overflow the DIV element. According to an embodiment, when height is added to a DIV element 205 by adding line breaks 605 as opposed to specifying a height dimension 310 of the DIV element, it may dynamically size itself to its content 405. Referring still to FIG. 7, the Web content 405 does not run out of the DIV element 205, nor does it interfere with the layout of the Web page, as in the previous example illustrated in FIG. 4.

According to an embodiment, two hidden DIV elements are utilized to provide precise pixel height limits, which determines at what point a line break 605 should be incremented or decremented as a user drags a lower resize marker 510 to resize a DIV element.

Figure 8:
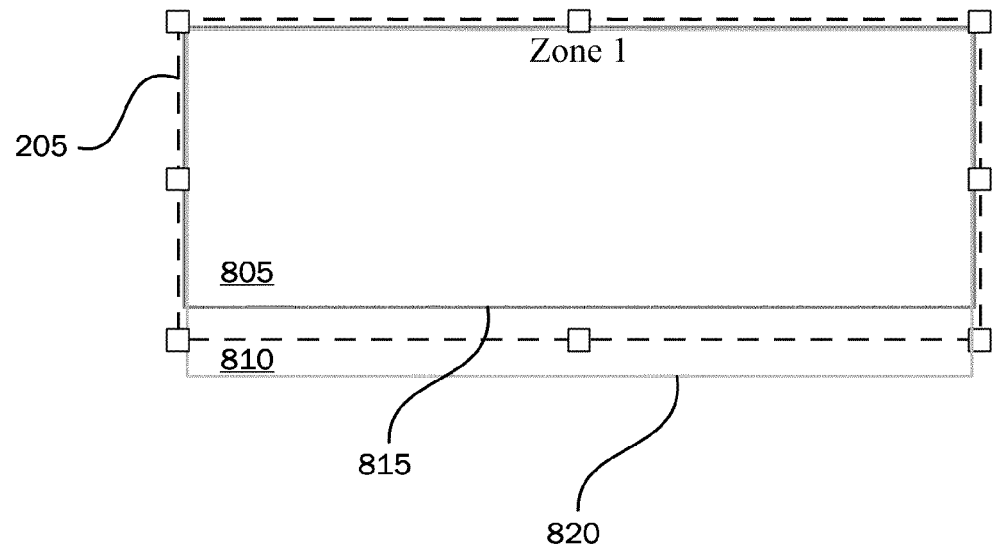
FIG. 8 is an illustration of an example DIV element, wherein a top hidden DIV element and a bottom hidden DIV element are shown.
Figure 9:
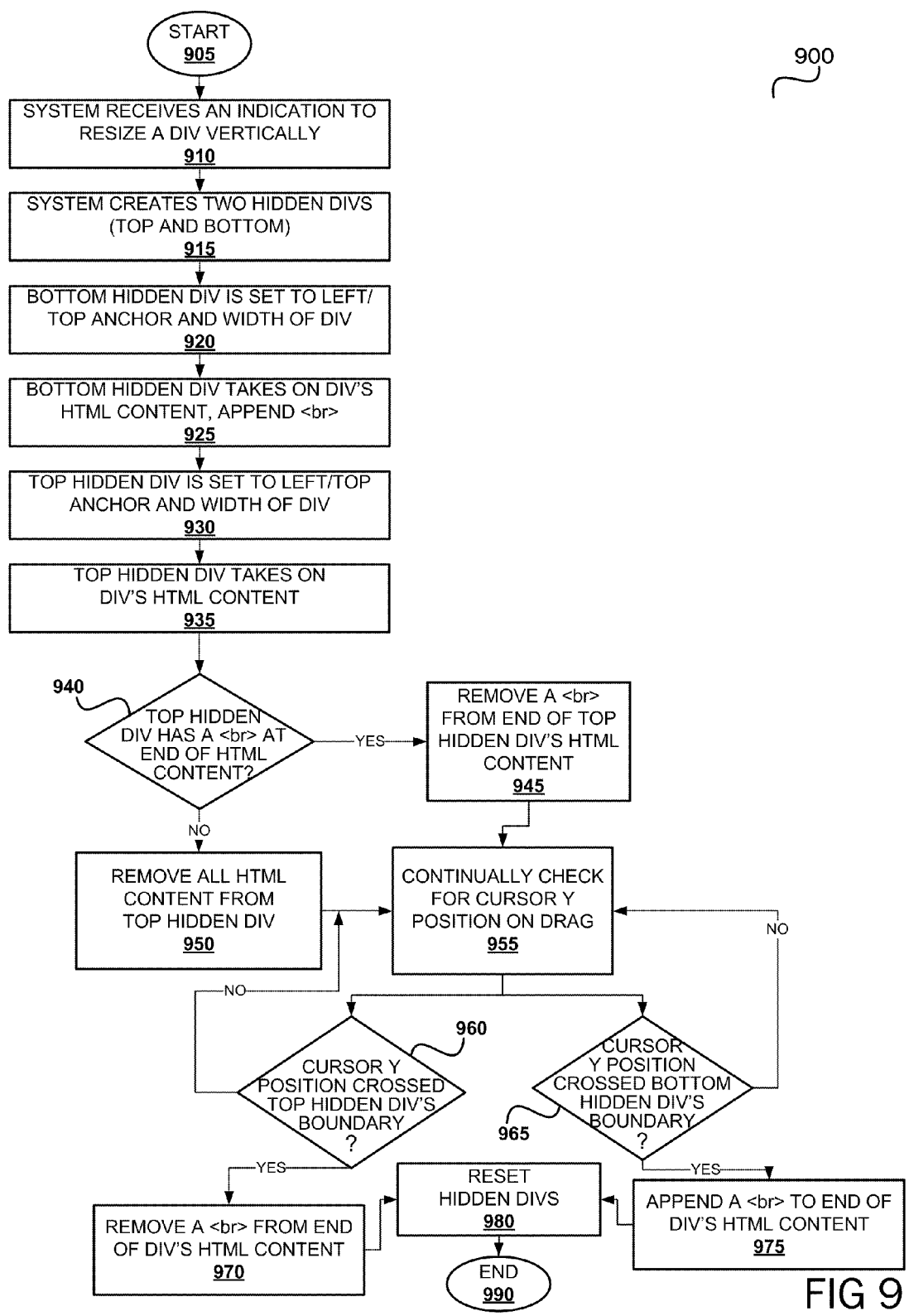
FIG. 9 is an example logical flow diagram illustrating a method for resizing the height of a DIV element, while preserving its ability to dynamically size to Web content via a browser using a Web-based authoring tool.

FIG. 8 is an illustration of an example DIV element 205, wherein a top hidden DIV element 805 and a bottom hidden DIV element 810 are shown. According to an embodiment, a top hidden DIV element 805 and a bottom hidden DIV element 810 may be set to the precise left/top anchor point of the DIV element 205 to be resized. The two hidden DIV elements 805,810 have the same width as the original DIV element 205, as well as the same HTML content 405. The difference between the hidden DIV elements and the original DIV element is that the top hidden DIV element 805 has one less line break HTML tag (<br>) 605 than the original DIV element 205, and the bottom hidden DIV element 810 has one more line break <br> 605 than the original DIV element 205. In effect, the two hidden DIV elements 805,810 establish an upper and lower pixel height boundary 815,820.

According to an embodiment, as a lower resize marker 510 is clicked-and-dragged, the cursor's X/Y position may be continually sampled via a scripting language, such as JAVASCRIPT by SUN MICROSYSTEMS.

If at any point a cursor's Y position crosses the top hidden DIV element's lower boundary 815, and if a line break 605 is present, then one or more <br>s 605 may be removed from the end of the original DIV element's 205 HTML content 405. If at any point a cursor's Y position crosses the bottom hidden DIV element's lower boundary 820, then one or more <br>s 605 may be appended to the end of the original DIV element's 205 HTML content 405. When a DIV element 205 is resized, the two hidden DIV elements' 805,810 lower boundaries 815,820 may be reestablished, and the process of resizing may be repeated.

According to an embodiment, a DIV element's 205 height cannot be shorter than its content. The HTML content 405 may be checked for line breaks 605 at the end of the content. If the content does not include a line break 605 at the end, then the top hidden DIV element's lower boundary 815 may not be established, and the DIV element's 205 height may not be moved beyond the boundary of content 405.

Having described embodiments of the present invention with respect to FIGS. 1-8, FIG. 9 is an example logical flow diagram illustrating a method for resizing the height of a DIV element, while preserving its ability to dynamically size to Web content as described above.

The method 900 begins at operation 905 and proceeds to operation 910 where a Web site authoring software system receives an indication to resize a DIV element 205 vertically. A user may give an indication to resize a DIV element 205 by various means, such as utilizing a mouse and performing a click-and-drag operation on a lower resize marker 510, by utilizing a keyboard and tabbing to a lower resize marker and then using the UP and/or DOWN keys, by utilizing touch or multi-touch technology, or by other various means known in the art.

Once the system receives an indication to resize a DIV element 205, the method proceeds to operation 915 where two hidden DIV elements (top and bottom) 805,810 are created. The two hidden DIV elements 805,810 are operative to establish an upper and lower pixel boundary 815,820 used to determine when a line break (<br>) 605 may be added to or removed from the DIV element's HTML content 405.

At operation 920, the bottom hidden DIV element 810 is set to the left/top anchor point of the original DIV element 205. The width of the bottom hidden DIV element 810 is set to equal the width of the original DIV element 205.

At operation 925, the HTML content 405 of the original DIV element 205 is replicated in the bottom hidden DIV element 810, and a line break (<br>) 605 is appended to the end.

At operation 930, the top hidden DIV element 805 is set to the left/top anchor point of the original DIV element 205. The width of the top hidden DIV element 805 is set to equal the width of the original DIV element 205.

At operation 935, the HTML content 405 of the original DIV element 205 is replicated in the top hidden DIV element 805.

At operation 940, a determination is made to see if a line break (<br>) 605 is at the end of the replicated HTML content 405.

If a line break (<br>) 605 is at the end of the replicated HTML content 405, then the method proceeds to operation 945 where a line break (<br>) 605 is removed from the end of the content.

If a line break (<br>) 605 is not at the end of the replicated HTML content 405, then the method proceeds to operation 950 where all the HTML content 405 is removed from the top hidden DIV element 805.

The method proceeds from operations 945 and 950 to operation 955 where the cursor's Y axis coordinates are continually checked and a determination is made whether it reaches either of the upper or lower boundaries 815,820 provided by the hidden DIV elements 805,810.

At operation 960, the system checks to see if the cursor's Y position has crossed the top hidden DIV element's lower boundary 815. If it has, the method proceeds to operation 970, where one or more line breaks (<br>) 605 is/are removed from the end of the DIV element's 205 HTML content 405. If the cursor's Y position has not crossed the top hidden DIV element's lower boundary 815 at operation 960, the method goes back to operation 955, where the cursor's Y position is continually checked.

At operation 965, the system checks to see if the cursor's Y position has crossed the bottom hidden DIV element's lower boundary 820. If it has, the method proceeds to operation 975, where one or more line breaks (<br>) 605 is/are appended to the end of the DIV element's 205 HTML content 405. If the cursor's Y position has not crossed the top hidden DIV element's lower boundary 815 at operation 965, the method goes back to operation 955, where the cursor's Y position is continually checked.

The method proceeds from operations 970 and 975 to operation 980 where the hidden DIV elements 805,810 are reset.

The method ends at operation 990.

Figure 10:
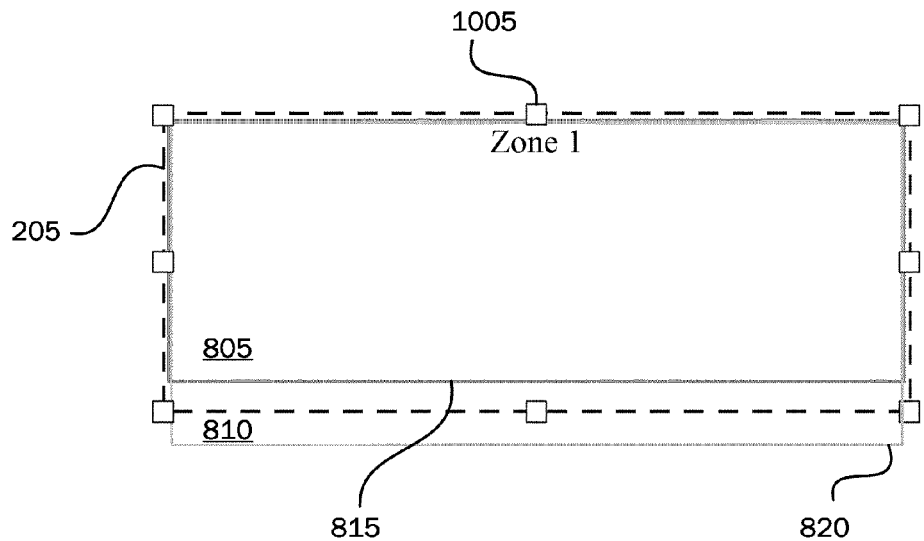
FIG. 10 is an illustration of an example DIV element containing an upper resize marker which may be utilized to vertically resize a DIV element.

According to another embodiment of the present invention, a user may click-and-drag on an upper resize marker to resize a DIV element 205. Referring to FIG. 10, a user may select an upper resize marker 1005 and drag the marker up or down to vertically resize a DIV element 205. The method of resizing a DIV element 205 using an upper resize marker 1005 is different than utilizing a lower resize marker 210.

Figure 11:
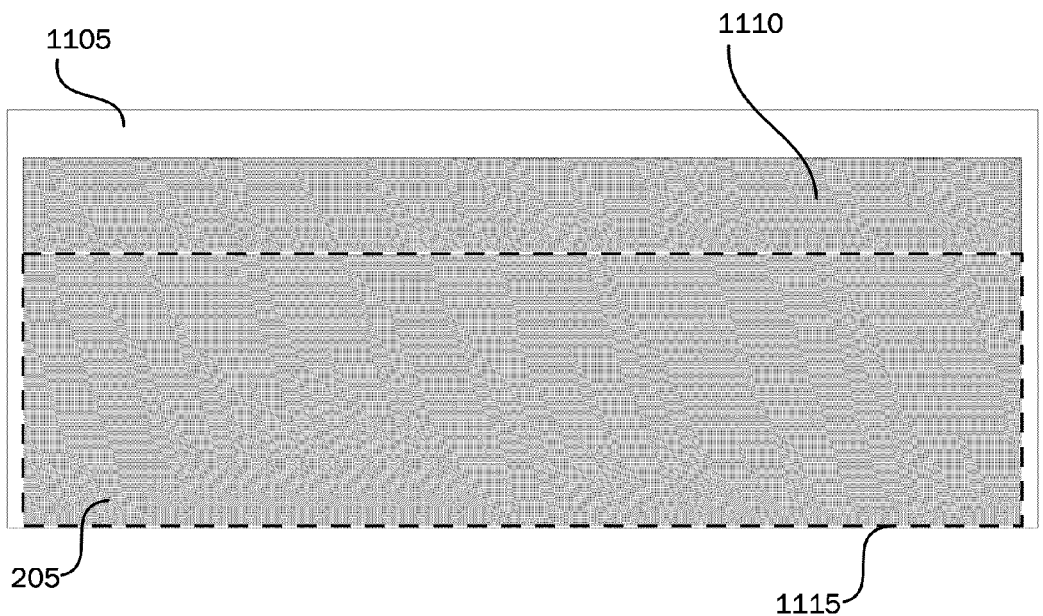
FIG. 11 is an illustration of a cell containing a DIV element and a hidden padding DIV element used for vertically resizing a DIV element by selecting and dragging an upper resize marker.

As described above, most modern Web pages are constructed with multiple zones. A zone is a DIV element that is enclosed by a table cell. Zones are containers in which a user may place Web content. Collectively, zones may form an entire Web site. A table may consist of a variable number of cells, and only some cells may contain zones. Referring now to FIG. 11, a zone cell 1105 is shown. Within a cell, a zone may be represented as a DIV element 205. Currently, these DIV elements 205 take up the full vertical extent of a cell. According to embodiments of the present invention, to allow for vertical resizing, a hidden padding DIV 1110 may be added to the top of each zone DIV element 205. By manipulating the pixel height of a hidden padding DIV element 1110, a zone DIV element 205 can be moved vertically and create vertical gaps. Referring still to FIG. 11, the bottom border 1115 of the zone DIV element 205 is touching the bottom of the cell 1105. This is because the cell 1105 sizes to its content 405. The height of a cell, and ultimately, of a table row may be determined by the combined height of a hidden padding DIV element 1110 and a zone DIV element 205. As more content 405 is added, the layout may expand vertically while preserving the table architecture.

If a user drags an upper resize box 1005 to resize a DIV element 205, like in previous embodiments described earlier, line breaks <br> 605 may be added or removed; however, in addition, a hidden padding DIV element 1110 may also be utilized. Upon a user selecting an upper resize marker 1005, two hidden DIV elements 805,810 may be created. If a user's cursor is moved downward and crosses below a distance equivalent to the distance between the top hidden DIV element's lower boundary 815 and the zone DIV element 205, then a determination is made to compress the zone DIV element's height. If a line break (<br>) 605 is at the end of the DIV element's 205 HTML content 405, then the height of the padding DIV element 1110 may be increased by the same distance. If there is not a line break (<br>) 605 at the end of the DIV element's 205 HTML content 405, then no action may be taken.

If a user's cursor is moved upward and crosses above a distance equivalent to the distance between the bottom hidden DIV element's lower boundary 820 and the zone DIV element 205, then a determination is made to stretch the zone DIV element's height. Accordingly, a line break <br> 605 may be appended to the end of the DIV element's 205 HTML content 405, and the same distance may be removed from the padding DIV element 1110.

It should be appreciated that a padding DIV element 1110 is just one way to achieve a vertical padding effect. Various methods may be utilized to achieve the same effect.

Figure 12:
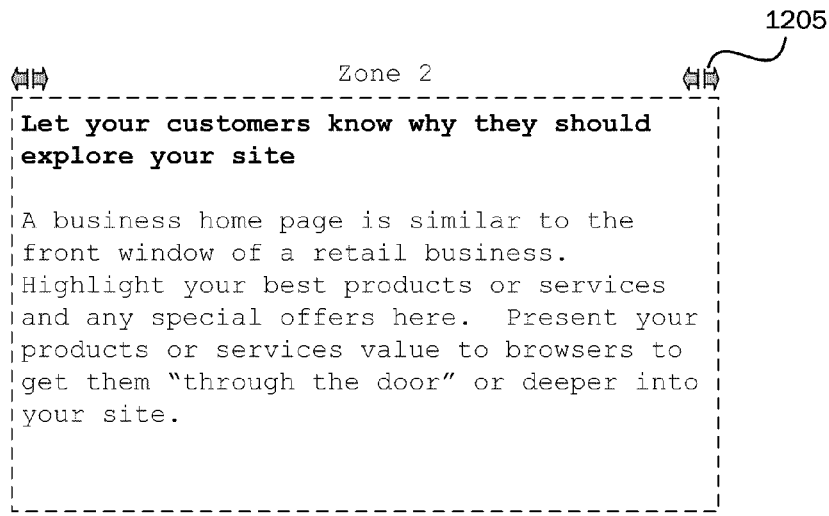
FIG. 12 is an illustration of an example DIV element containing a horizontal resize marker or handle which may be utilized to horizontally resize a DIV element.

According to another embodiment, a user may horizontally resize a DIV element 205 utilizing a horizontal resize marker or handle. Current methods exist for horizontally resizing a DIV element 205 utilizing resize handles 1205 as illustrated in FIG. 12. When a user selects and moves a left or a right resize handle 1205 of a DIV element 205, the width of the DIV element and the width of a space to its left or right may be adjusted. All widths may be maintained as a percentage of the total width of the content area of a Web page. If a user utilizes a mouse or other selection mechanism to move a horizontal resize handle 1205, the distance the handle is moved in pixels is converted to an appropriate proportion of the total width of the content area. The proportion is used as an increment to the width of the DIV element 205, and as a decrement to the width of an adjacent space. If a user utilizes a keyboard to move a horizontal resize handle 1205, each LEFT or RIGHT keystroke may be interpreted as a fixed percentage value to increment the width of a DIV element 205.

Figure 13:
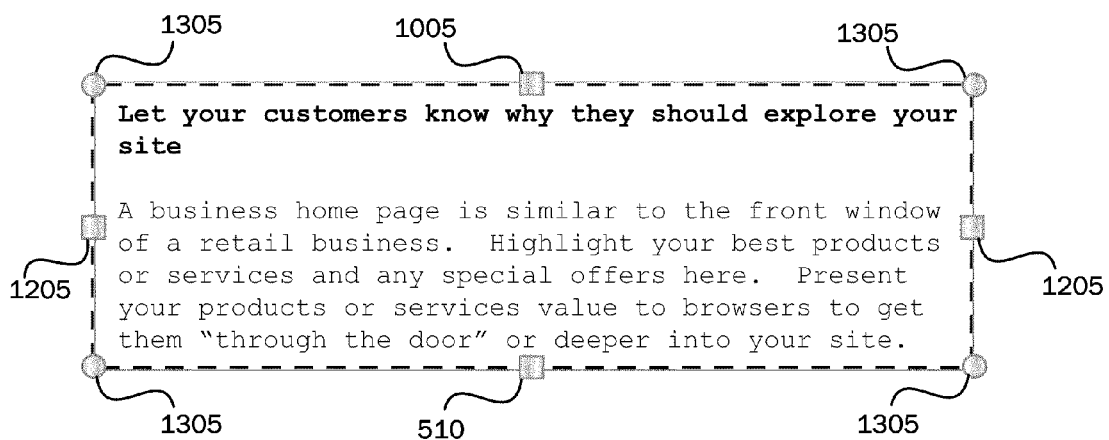
FIG. 13 is an illustration of an example DIV element containing an eight-resize marker user interface.

By combining embodiments of the present invention with embodiments of horizontal resizing methods, an eight-resize marker user interface (UI) may be achieved. As illustrated in FIG. 13, an eight-resize marker UI is shown. By combining embodiments of horizontal resizing with vertical resizing, full resizing in four directions may be achieved. According to an embodiment, a user may select and drag on any corner resize markers 1305 to resize both the width and height of a DIV element 205.

Figure 14:
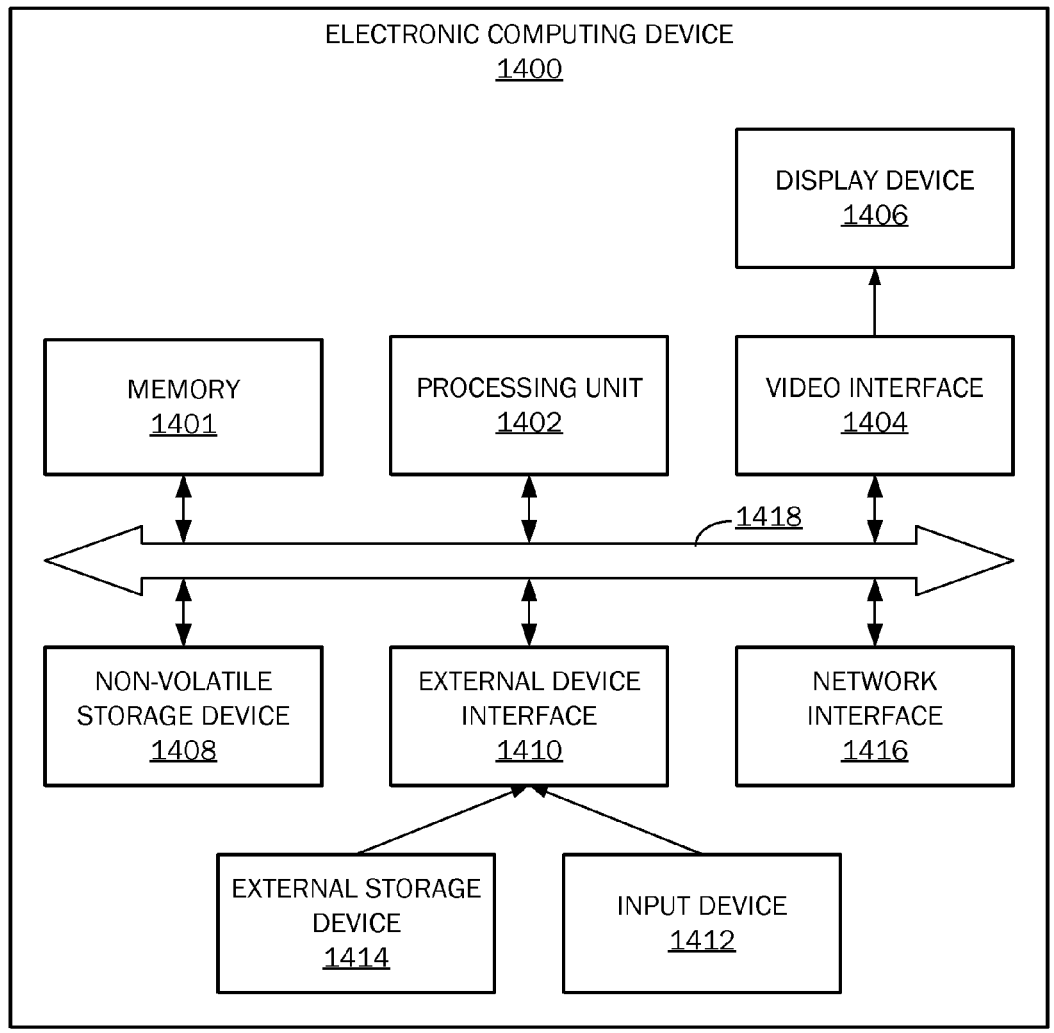
FIG. 14 is a block diagram illustrating example physical components on a computing device with which embodiments of the invention may be practiced.

Having described embodiments of the present invention and an example logical flow illustrating a method for resizing the height of a DIV element while preserving its ability to dynamically size to Web content, FIG. 14 is a block diagram illustrating example physical components on a computing device 1400 with which embodiments of the invention may be practiced. Client system 110 and server system 130 and/or electronic computing devices within client system 110 and/or server system 130 may be implemented in the manner of electronic computing device 1400. As illustrated in the example of FIG. 14, electronic computing device 1400 comprises a memory unit 1401. Memory unit 1401 is a computer-readable data storage medium that is capable of storing data and instructions. Memory unit 1401 may be a variety of different types of computer-readable data storage media including, but not limited to, dynamic random access memory (DRAM), double data rate synchronous dynamic random access memory (DDR SDRAM), reduced latency DRAM, DDR SDRAM, DDR3 SDRAM, Rambus RAM, or other types of computer-readable data storage media.

In addition, electronic computing device 1400 comprises a processing unit 1402. In a first example, processing unit 1402 may execute software instructions that cause processing unit 1402 to provide specific functionality. In this first example, processing unit 1402 may be implemented as one or more processing cores and/or as one or more separate microprocessors. For instance, in this first example, processing unit 1402 may be implemented as one or more Intel Core2 microprocessors. Processing unit 1402 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 1402 may be implemented as an application specific integrated circuit (ASIC) that provides specific functionality. In a third example, processing unit 1402 may provide specific functionality by using an ASIC and by executing software instructions.

Electronic computing device 1400 also comprises a video interface 1404 that enables a client system 110 or a server system 130 to output video information to display device 1406. Display device 1406 may be a variety of different types of display devices. For instance, display device 1406 may be a cathode-ray tube display, an LCD display panel, a plasma screen display panel, a touch-sensitive display panel, a LED array, or another type of display device.

In addition, electronic device 1402 includes a non-volatile storage device 1408. Non-volatile storage device 1408 is a computer-readable data storage medium that is capable of storage data and/or instructions. Non-volatile storage device 1408 may be a variety of different types of different non-volatile storage devices. For example, non-volatile storage device 1408 may be one or more hard disk drives, magnetic tape drives, CD-ROM drives, DVD-ROM drives, Blu-Ray disc drives, or other types on non-volatile storage devices.

Electronic computing device 1400 also includes an external component interface 1410 that enables client system 110 and server system 130 to communicate with external components. As illustrated in the example of FIG. 14, external component interface 1410 communicates with an input device 1412 and an external storage device 1414. In one implementation of electronic computing device 1400, external component interface 1410 is a Universal Serial Bus (USB) interface. In other implementations of electronic computing device 1400, electronic computing device 1400 may include another type of interface that enables electronic computing device 1400 to communicate with input device and/or output devices. For instance, electronic computing device 1400 may include a PS/2 interface. Input device 1412 may be a variety of different types of devices including, but not limited to, keyboards, mice, trackballs, stylus input devices, touch pads, touch-sensitive display devices, touch-sensitive display screens, or other types of input devices. External storage device 1414 may be a variety of different types of computer-readable data storage media including magnetic tape, flash memory modules, magnetic disk drives, optical disc drives, and other computer-readable data storage media.

In addition, electronic computing device 1400 includes a network interface 1416 that enables electronic computing device 1400 to send data to and receive data from network 120. Network interface 1416 may be a variety of different types of network interface. For example, network interface 1416 may be an Ethernet interface, a token-ring interface, a fiber optic interface, a wireless network interface (e.g. WiFi, WiMax, etc.), or another type of network interface. As should be appreciated, network interface 1416 may be operable to accessing and utilizing a remote application 140 stored on a remote server 130.

Electronic computing device 1400 also includes a communications medium 1418 that facilitates communication among the various components of electronic computing device 1400. Communications medium 1418 may comprise one or more different types of communication media including, but not limited to, a PCI bus, a PCI Express bus, an accelerated graphics port (AGP) bus, an Infiniband interconnect, a serial Advanced Attachment (ATA) interconnect, a parallel ATA interconnect, a Fiber Channel interconnect, a USB bus, a Small Computer System Interface (SCSI) interface, or another type of communications medium.

Several computer-readable data storage media are illustrated in the example of FIG. 14 (i.e. memory unit 1401, non-volatile storage device 1408, and external storage device 1414). Together, these computer-readable data storage media may constitute a single logical computer-readable data storage medium. This single logical computer-readable data storage medium may store instructions executable by processing unit 1402. Actions described in the above description may result from the execution of the instructions stored on this single logical computer-readable data storage medium. Thus, when this description says that a particular logical module performs a particular action, such a statement may be interpreted to mean that instructions of the software module cause a processing unit, such as processing unit 1402, to perform the action.

As described herein, an improved method is provided for resizing the height and/or width of a DIV element while preserving its ability to dynamically size to Web content. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method for resizing an editable Web page zone of a Web page, the method comprising:

receiving an editable Web page zone of a Web page, the editable Web page zone comprising a first HTML DIV element;

providing along a lower border of the editable Web page zone a lower resize marker for vertically resizing the editable Web page zone;

receiving an indication of a selection of the lower resize marker for vertically resizing the editable Web page zone;

in response to receiving an indication of a selection of the lower resize marker for vertically resizing the editable Web page zone disposing a top hidden DIV element and a bottom hidden DIV element onto the Web page zone;

replicating an HTML content contained in the first HTML DIV element into the top hidden DIV element;

if an HTML line break tag is at the end of the HTML content replicated to the top hidden DIV element, removing a line break tag from the end of the replicated HTML content in the top hidden DIV element;

if an HTML line break tag is not at the end of the HTML content replicated to the top hidden DIV element, removing all HTML content from the top hidden DIV element;

replicating the HTML content contained in the first HTML DIV element into the bottom hidden DIV element, and adding an HTML line break tag to the end of the HTML content replicated into the bottom hidden DIV element;

continually monitoring a vertical position of the lower resize marker; and, if the vertical position of the lower resize marker crosses a lower boundary of the top hidden DIV element, removing one or more HTML line break tags from the end of the HTML content contained in the first HTML DIV element;

if the vertical position of the lower resize marker crosses a lower boundary of the bottom hidden DIV element, appending one or more HTML line break tags to the end of the HTML content contained in the first HTML DIV element.

2. The method of claim 1, wherein resizing an editable Web page zone of a Web page is executed within a Web browser application.

3. The method of claim 1, wherein a positioning of the lower resize marker is controlled via a mouse-activated drag and drop operation.

4. The method of claim 1, wherein a positioning of the lower resize marker is controlled via a keystroke operation.

5. The method of claim 1, further comprising resetting the hidden DIV elements upon a completion of a vertical resizing of the first HTML DIV element.

6. The method of claim 1, further comprising:
providing along an upper border of the editable Web page zone an upper resize marker for vertically resizing the editable Web page zone;
receiving an indication of a selection of the upper resize marker for vertically resizing the editable Web page zone;
in response to receiving an indication of a selection of the upper resize marker for vertically resizing the editable Web page zone, disposing a padded DIV element above the first HTML DIV element, and:
if a vertical position of the upper resize marker is moved downward a distance equivalent to a distance between the lower boundary of the top hidden DIV element and a lower boundary of the first HTML DIV element,
removing an HTML line break tag from the end of the HTML content contained in the first HTML DIV element; and
increasing a height of the padding DIV element by the distance equivalent to a distance between the lower boundary of the top hidden DIV element and a lower boundary of the first HTML DIV element; and
if a vertical position of the upper resize marker is moved upward a distance equivalent to the distance between the lower boundary of the bottom hidden DIV element and the first HTML DIV element:
appending an HTML line break tag to the end of the HTML content contained in the first HTML DIV element; and
decreasing a height of the padding DIV element by the distance equivalent to a distance between the lower boundary of the top hidden DIV element and a lower boundary of the first HTML DIV element.

7. The method of claim 1, further comprising:
disposing a horizontal resize marker along a right or left edge of the first HTML DIV element; and
wherein, in response to receiving a movement of the horizontal resize marker horizontally, expanding or decreasing a size of the first HTML DIV element horizontally in a direction of the movement of the horizontal resize marker.

8. The method of claim 1, further comprising:
disposing a corner resize marker along a corner of the first HTML DIV element; and
wherein, in response to receiving a movement of the corner resize marker diagonally, expanding or decreasing a size of the first HTML DIV element vertically and/or horizontally in a direction of the movement of the corner resize marker.

9. A computer readable medium containing computer executable instructions which when executed by a computer perform a method for resizing an editable Web page zone of a Web page, the method comprising:
receiving an editable Web page zone of a Web page, the editable Web page zone comprising a first HTML DIV element;
providing along a lower border of the editable Web page zone a lower resize marker for vertically resizing the editable Web page zone;
receiving an indication of a selection of the lower resize marker for vertically resizing the editable Web page zone;
in response to receiving an indication of a selection of the lower resize marker for vertically resizing the editable Web page zone disposing a top hidden DIV element and a bottom hidden DIV element onto the Web page zone;
replicating an HTML content contained in the first HTML DIV element into the top hidden DIV element;
if an HTML line break tag is at the end of the HTML content replicated to the top hidden DIV element, removing a line break tag from the end of the replicated HTML content in the top hidden DIV element;
if an HTML line break tag is not at the end of the HTML content replicated to the top hidden DIV element, removing all HTML content from the top hidden DIV element;
replicating the HTML content contained in the first HTML DIV element into the bottom hidden DIV element, and adding an HTML line break tag to the end of the HTML content replicated into the bottom hidden DIV element;
continually monitoring a vertical position of the lower resize marker; and,
if the vertical position of the lower resize marker crosses a lower boundary of the top hidden DIV element, removing one or more HTML line break tags from the end of the HTML content contained in the first HTML DIV element;
if the vertical position of the lower resize marker crosses a lower boundary of the bottom hidden DIV element, appending one or more HTML line break tags to the end of the HTML content contained in the first HTML DIV element.

10. The computer readable medium of claim 9, wherein resizing an editable Web page zone of a Web page is executed within a Web browser application.

11. The computer readable medium of claim 9, wherein a positioning of the lower resize marker is controlled via a mouse-activated drag and drop operation.

12. The computer readable medium of claim 9, wherein a positioning of the lower resize marker is controlled via a keystroke operation.

13. The computer readable medium of claim 9, further comprising resetting the hidden DIV elements upon a completion of a vertical resizing of the first HTML DIV element.

14. The computer readable medium of claim 9, further comprising:
providing along an upper border of the editable Web page zone an upper resize marker for vertically resizing the editable Web page zone;
receiving an indication of a selection of the upper resize marker for vertically resizing the editable Web page zone;
in response to receiving an indication of a selection of the upper resize marker for vertically resizing the editable Web page zone, disposing a padded DIV element above the first HTML DIV element, and:
if a vertical position of the upper resize marker is moved downward a distance equivalent to a distance between the lower boundary of the top hidden DIV element and a lower boundary of the first HTML DIV element, removing an HTML line break tag from the end of the HTML content contained in the first HTML DIV element; and increasing a height of the padding DIV element by the distance equivalent to a distance between the lower boundary of the top hidden DIV element and a lower boundary of the first HTML DIV element; and if a vertical position of the upper resize marker is moved upward a distance equivalent to the distance between the lower boundary of the bottom hidden DIV element and the first HTML DIV element:

appending an HTML line break tag to the end of the HTML content contained in the first HTML DIV element; and decreasing a height of the padding DIV element by the distance equivalent to a distance between the lower boundary of the top hidden DIV element and a lower boundary of the first HTML DIV element.

15. A method for resizing an editable Web page zone of a Web page, the method comprising:

receiving an editable Web page zone of a Web page, the editable Web page zone comprising a first HTML DIV element;

providing along a lower border of the editable Web page zone a lower resize marker for vertically resizing the editable Web page zone;

receiving an indication of a selection of the lower resize marker for vertically resizing the editable Web page zone;

in response to receiving an indication of a selection of the lower resize marker for vertically resizing the editable Web page zone disposing a top hidden DIV element and a bottom hidden DIV element onto the Web page zone;

replicating an HTML content contained in the first HTML DIV element into the top hidden DIV element;

if an HTML line break tag is at the end of the HTML content replicated to the top hidden DIV element, removing a line break tag from the end of the replicated HTML content in the top hidden DIV element;

if an HTML line break tag is not at the end of the HTML content replicated to the top hidden DIV element, removing all HTML content from the top hidden DIV element;

replicating the HTML content contained in the first HTML DIV element into the bottom hidden DIV element, and adding an HTML line break tag to the end of the HTML content replicated into the bottom hidden DIV element;

continually monitoring a vertical position of the lower resize marker; and, if the vertical position of the lower resize marker crosses a lower boundary of the top hidden DIV element, removing one or more HTML line break tags from the end of the HTML content contained in the first HTML DIV element;

if the vertical position of the lower resize marker crosses a lower boundary of the bottom hidden DIV element, appending one or more HTML line break tags to the end of the HTML content contained in the first HTML DIV element;

providing along an upper border of the editable Web page zone an upper resize marker for vertically resizing the editable Web page zone;

receiving an indication of a selection of the upper resize marker for vertically resizing the editable Web page zone;

in response to receiving an indication of a selection of the upper resize marker for vertically resizing the editable Web page zone, disposing a padded DIV element above the first HTML DIV element, and:

if a vertical position of the upper resize marker is moved downward a distance equivalent to a distance between the lower boundary of the top hidden DIV element and a lower boundary of the first HTML DIV element, removing an HTML line break tag from the end of the HTML content contained in the first HTML DIV element; and increasing a height of the padding DIV element by the distance equivalent to a distance between the lower boundary of the top hidden DIV element and a lower boundary of the first HTML DIV element; and if a vertical position of the upper resize marker is moved upward a distance equivalent to the distance between the lower boundary of the bottom hidden DIV element and the first HTML DIV element:

appending an HTML line break tag to the end of the HTML content contained in the first HTML DIV element; and decreasing a height of the padding DIV element by the distance equivalent to a distance between the lower boundary of the top hidden DIV element and a lower boundary of the first HTML DIV element.

16. The method of claim 15, wherein resizing an editable Web page zone of a Web page is executed within a Web browser application.

17. The method of claim 15, wherein a positioning of the lower resize marker is controlled via a mouse-activated drag and drop operation.

18. The method of claim 15, wherein a positioning of the lower resize marker is controlled via a keystroke operation.

19. The method of claim 15, further comprising resetting the hidden DIV elements upon a completion of a vertical resizing of the first HTML DIV element.

20. The method of claim 15, further comprising:

disposing a horizontal resize marker along a right or left edge of the first HTML DIV element, wherein, in response to receiving a movement of the horizontal resize marker horizontally, expanding or decreasing a size of the first HTML DIV element horizontally in a direction of the movement of the horizontal resize marker; and disposing a corner resize marker along a corner of the first HTML DIV element; wherein, in response to receiving a movement of the corner resize marker diagonally, expanding or decreasing a size of the first HTML DIV element vertically and/or horizontally in a direction of the movement of the corner resize marker.

* * * * *